April 21, 1964  H. C. SHANK, JR  3,130,107
MEANS FOR DECORATING GLASS ARTICLES
Filed Aug. 11, 1960  6 Sheets-Sheet 1
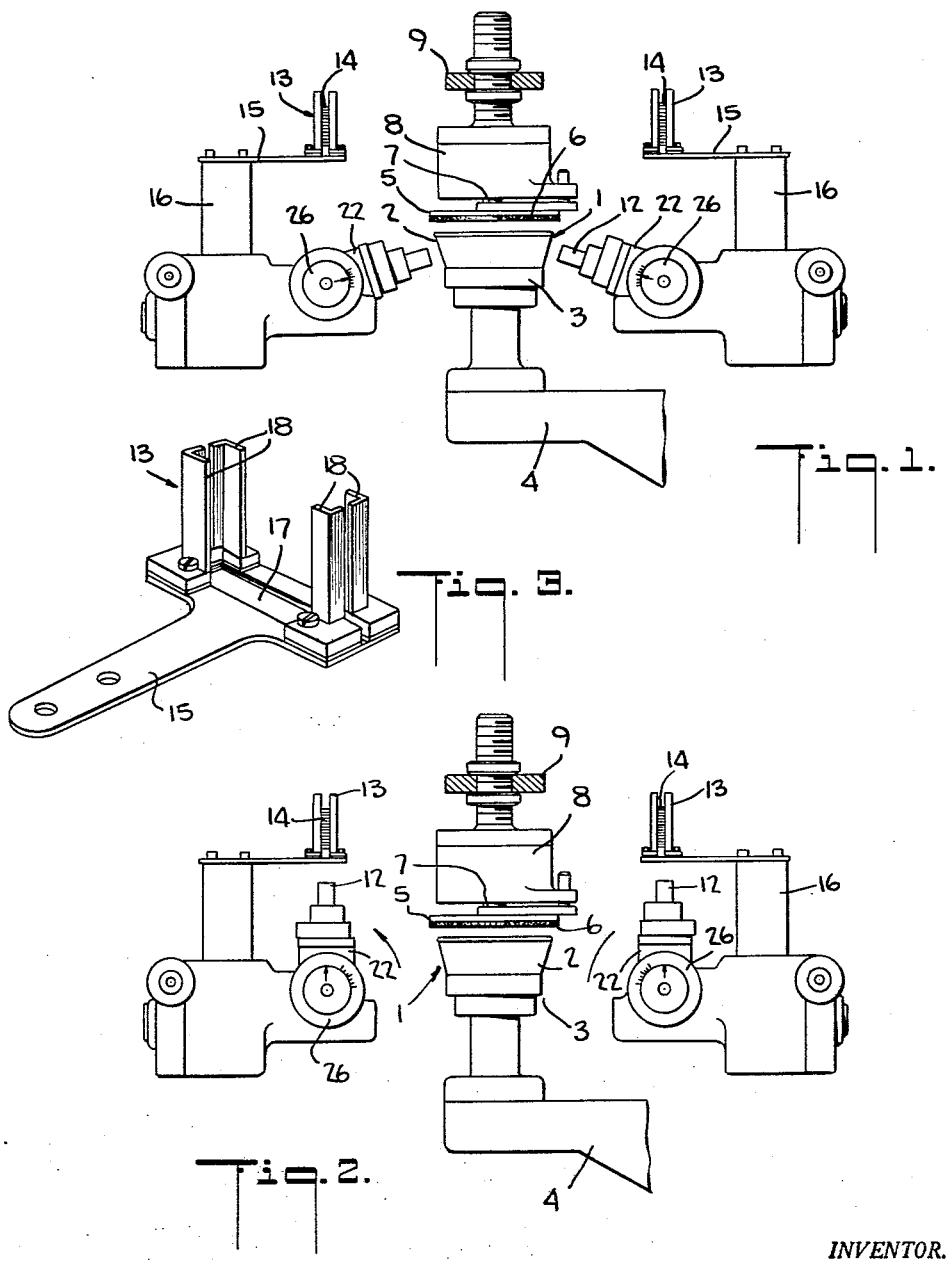
INVENTOR.
HERBERT C. SHANK, JR.
BY
ATTORNEY

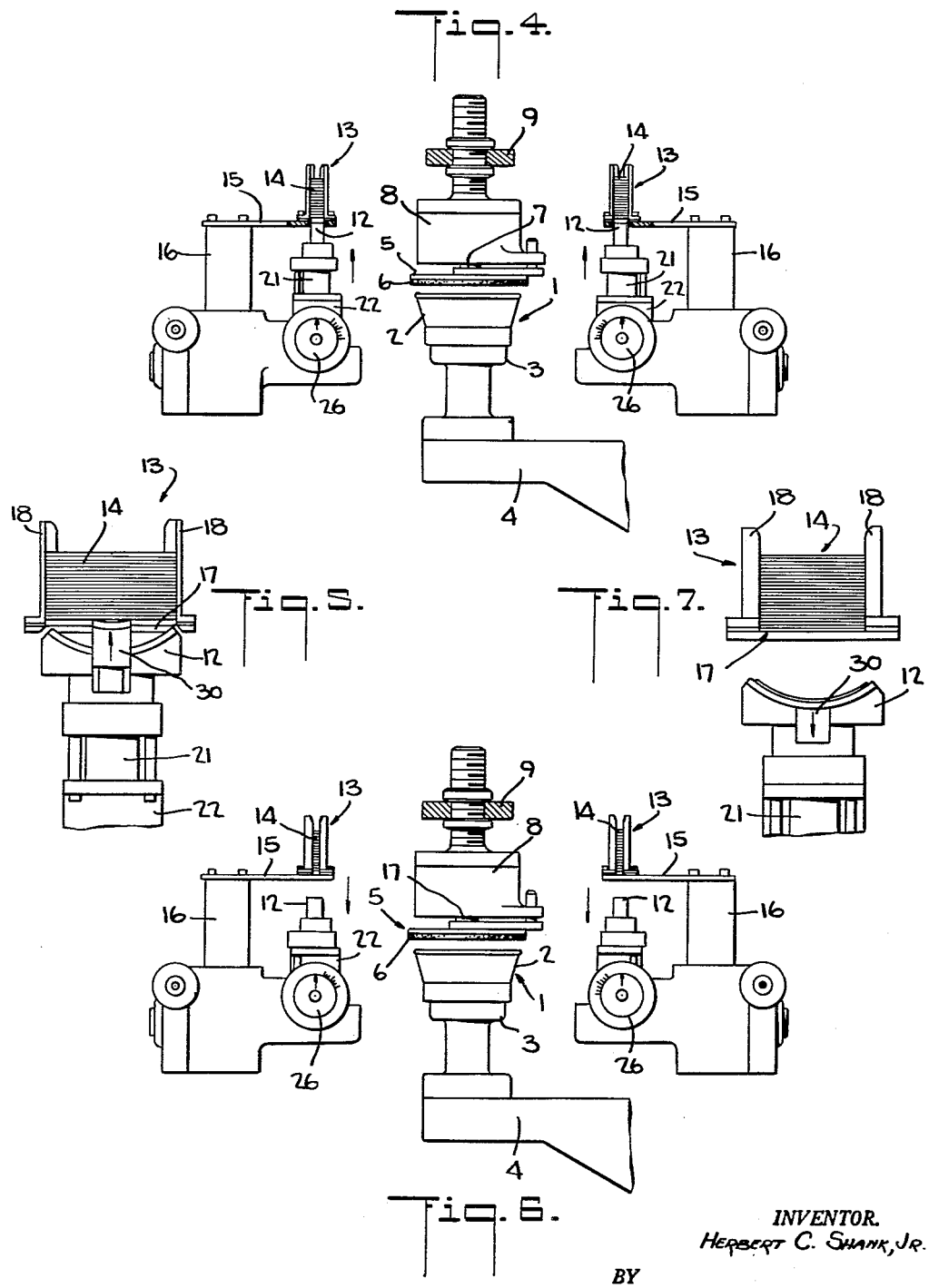

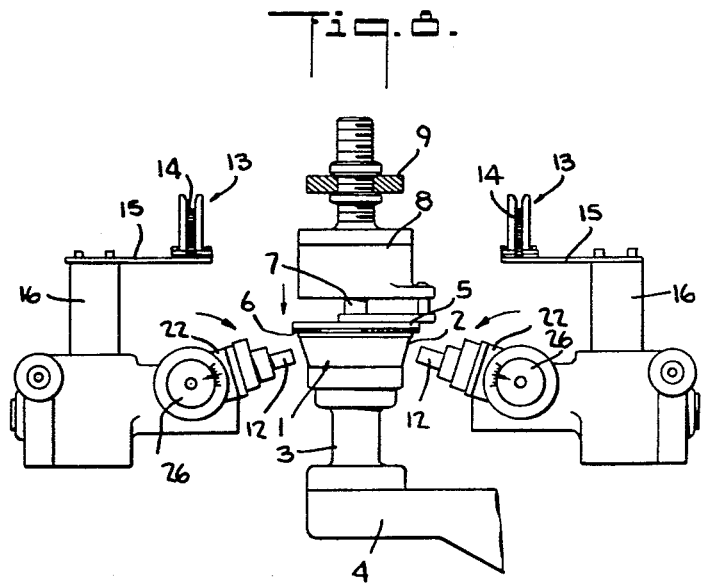
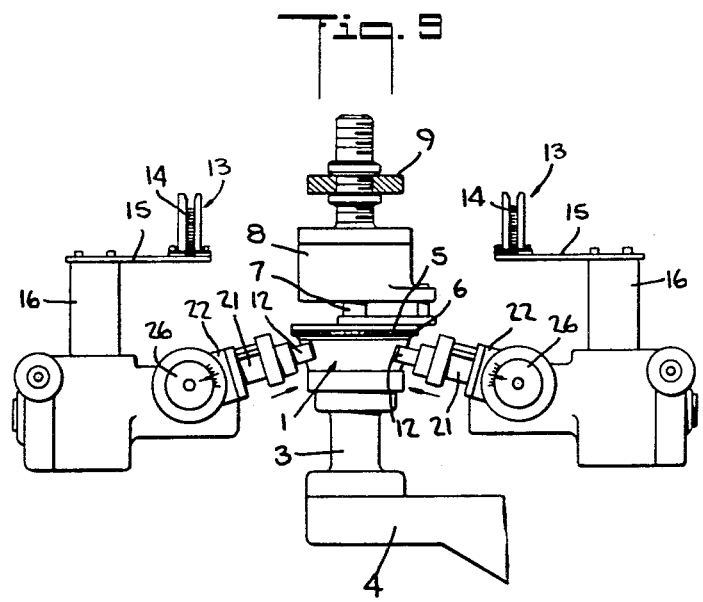

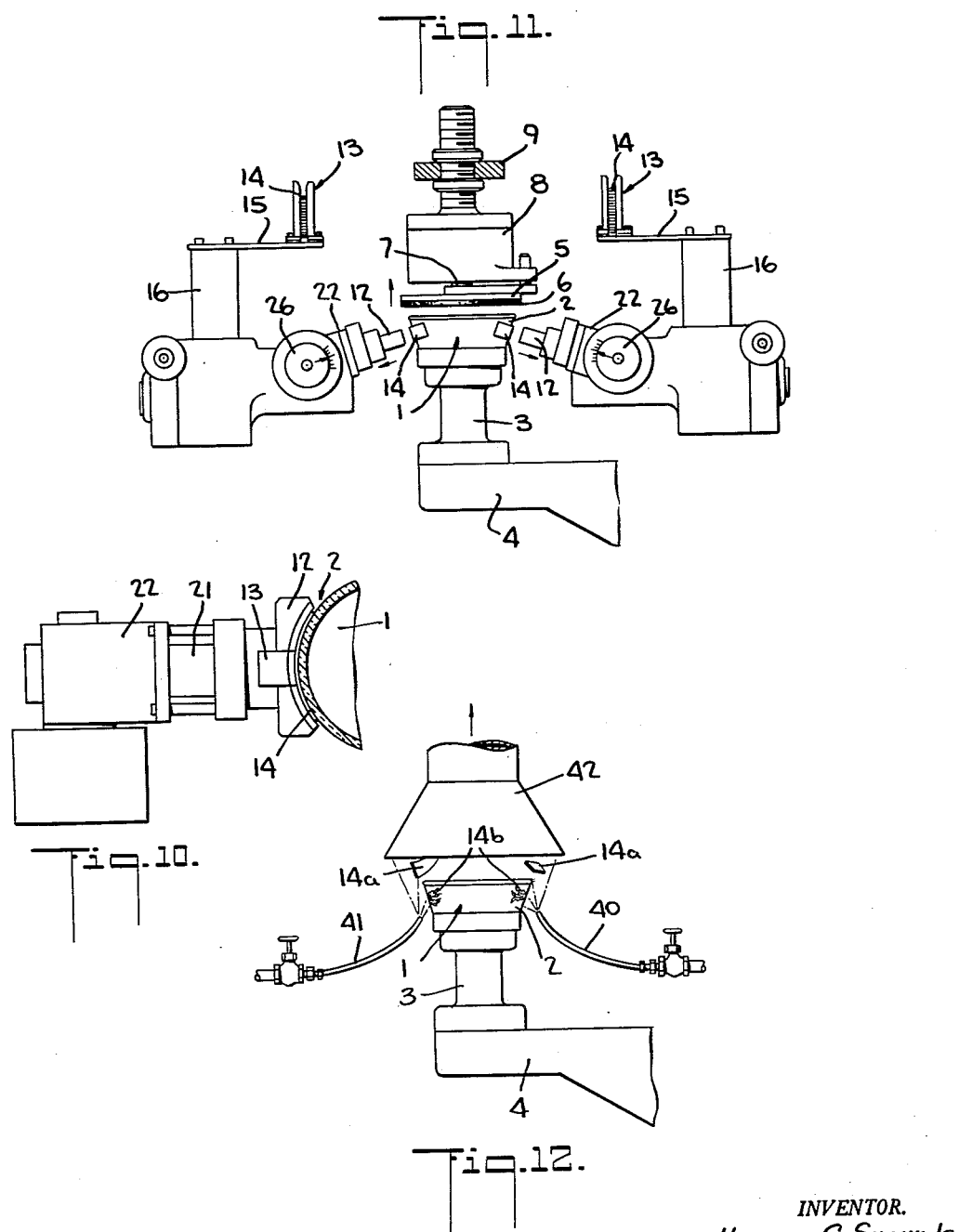

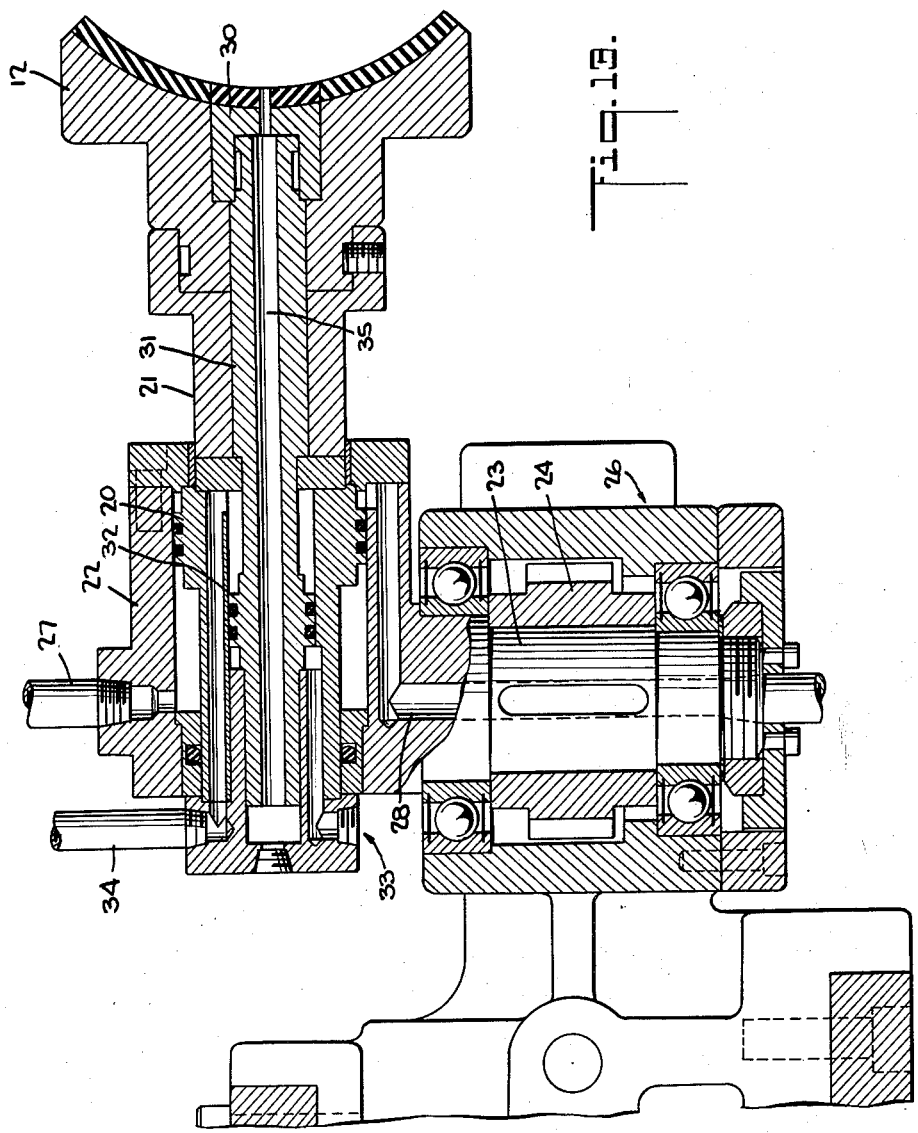

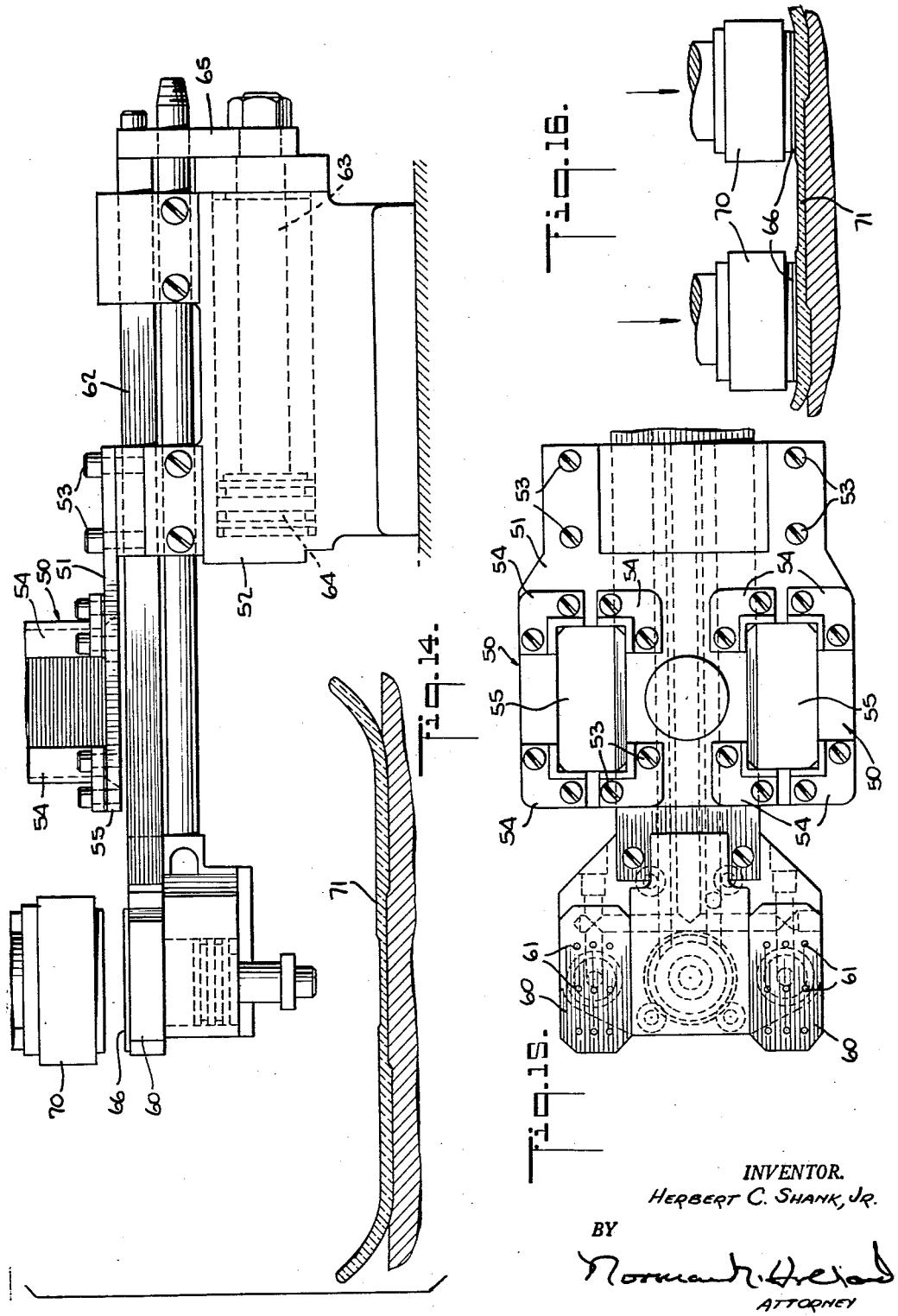

United States Patent Office 3,130,107
Patented Apr. 21, 1964

3,130,107
MEANS FOR DECORATING GLASS ARTICLES
Herbert C. Shank, Jr., Lancaster, Ohio, assignor to Anchor Hocking Glass Corporation, Lancaster, Ohio, a corporation of Delaware
Filed Aug. 11, 1960, Ser. No. 49,093
4 Claims. (Cl. 156—559)

The present invention relates to means for decorating glass and is an improvement over my copending United States patent application Serial No. 836,487, filed in the United States Patent Office on August 27, 1959, now Patent No. 3,031,370, for Method and Means for Decorating Glass.

My prior application described a method and means for decorating the sides of an article, such as a glass article, with a decoration, such as a decal, which utilizes a pair of applicator arms which swing downwardly in an arc. Slidable picker heads remove the decorations from a supply, move in the path of the swinging arms and transfer the decorations to the applicator arms which, after the picker heads are withdrawn, continue their downward swing to apply the decoration to the sides of the article.

The decorating machine described and claimed in my prior copending application also utilizes means for applying a single decoration to the bottom of an article.

My present invention is an improvement over my prior copending application and has for one of its objects the provision of an improved mechanism for applying decorations to the sides of an article.

Another object of the present invention is the provision of an improved decal decorating machine for applying a plurality of decals to the bottom of an article in predetermined spaced relationship to each other.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

FIG. 1 is a diagrammatic view showing the first step in the application of a decoration to the sides of an article in accordance with the present invention;

FIG. 2 is a diagrammatic view similar to FIG. 1 showing the applicator heads beneath hoppers for the decorations in position to remove a decoration therefrom;

FIG. 3 is an enlarged perspective view showing the hopper in which the decorations are stored;

FIG. 4 is a view similar to FIG. 1 showing the applicator heads in their raised position to remove a decoration from each hopper;

FIG. 5 is a detail view showing the picker plunger in extended position to remove a decoration;

FIG. 6 is a similar view showing the applicator heads in their retracted position after having removed a decoration from the hoppers;

FIG. 7 is a detail of FIG. 6 showing the picker plunger in its retracted position;

FIG. 8 is a similar view showing the applicator heads rotated back to their decoration-applying position;

FIG. 9 is a similar view showing the applicator heads extended in decoration-applying position;

FIG. 10 is a detail of FIG. 9 showing the position of the applicator heads during the application of the decorations to the article;

FIG. 11 is a similar view showing the applicator heads being retracted after the decorations are applied;

FIG. 12 is a similar view showing the paper backing of a decoration being blown off;

FIG. 13 is a sectional side view showing one of the applicator heads of the present invention;

FIG. 14 is a side elevational view showing the mechanism for applying a plurality of decorations to the bottom of an article;

FIG. 15 is a top elevational view showing the position of the hoppers for storing the decorations; and FIG. 16 is a diagrammatic view showing a plurality of decorations being applied to the bottom of an article.

As more fully described in my prior copending application, when an article leaves the glass making machine, it is first glazed and is then moved through a cooling tunnel. After it has been sufficiently cooled, the article is deposited on the turntable of a decorating mechanism which applies the decoration to the article. The article is then placed on an annealing lehr which anneals the article with the decoration on it.

The decoration is preferably a decal comprising a back sheet and a color or design layer adhered thereto. The design is preferably a ceramic design so as to fuse with the article being decorated. On the side of the design opposite the side which has the back sheet adhered thereto, a suitable heat effective adhesive is applied which permits the decal to be adhered to the article. After the decal is adhered to the article the heat will soften the adhesive between the design and the back sheet and permit it to be blown off or otherwise removed.

Referring now more particularly to FIG. 1, an article 1, preferably made of glass, having a side wall 2 is carried on a chuck 3 on a turntable 4. The turntable 4 rotates intermittently from one station to another and at the decorating station, shown in FIG. 1, positions the article 1 beneath a hold-down head 5 having a rubber pad 6. The hold-down head 5 depends from a piston rod 7 (see FIGS. 8 and 9) mounted on a piston (not shown) which is movable within an air cylinder 8 threadably mounted for vertical adjustment on the frame 9 of the machine.

A pair of pivotally mounted applicator heads 12 are located on each side of and below the hold-down head 5 and are spaced apart from each other a distance sufficient to permit the turntable 5 to place the chuck 3 and article 1 therebetween.

A pair of hoppers 13 adapted to store a stack of decals 14 are located above each pivotally mounted applicator 12. The hoppers 13 are shown in greater detail in FIG. 3 and comprise a bracket 15, mounted on a frame 16 (FIG. 1), having an opening 17 and L-shaped standards 18 at each corner to hold the stack of decals 14 in place. When a decal is to be removed from the stack, the applicator heads 12 will pull the lowermost decal 14 downwardly out of the hopper 13 through the bottom opening 17.

The applicator head 12 of the present invention is shown in detail in FIG. 13 and comprises a piston 20 having a piston rod 21 to which the applicator head 12 is mounted. The piston 20 is movable within a cylinder 22 which is mounted on a shaft 23 rotatable by means of gear 24 in gear box 26. Rotation of the shaft 23 will swing the applicator heads to the desired position. Suitable air conduits 27 and 28 direct air to either side of the piston 20 to control the movement of the piston 20 and its applicator head 12.

Centrally mounted for movement within the applicator head 12 is a picker plunger 30 which is mounted on a piston 32 through a piston 31 and which is adapted to be moved with the piston 20 which controls the movement of the applicator head 12. Suitable conduits 33 and 34 control the movement of the piston 32 and its picker plunger 30. The picker plunger 30 and its piston rod 31 and piston 32 have a central bore 35 which is adapted to create a suction to permit the picker plunger 30 to grasp and hold a decal on the applicator head 12.

With this arrangement when the applicator head 12 is in position to remove a decal 14 from the hopper 13, air is applied by the conduits 27 and 33 to move the applicator head 12 and the picker plunger 30 forward. Suction is created by withdrawing air through the central bore 35 to grasp and hold the decal in place on the applicator head 12 (see FIG. 5). To retract the picker plunger 30 and the applicator head 12, air is shut off from the conduits 33 and 27 and admitted through conduits 34 and 28 so as to retract the applicator head 12 and the picker plunger 30 (FIG. 7).

However, when the decal 14 is to be applied to the sides of the article, air is admitted through conduit 27 only so that only the applicator head 12 is moved forward while the picker plunger 30 is not moved and remains flush therewith (FIG. 10).

The steps of applying the decal to an article will now be described in greater detail.

In the initial position, as shown in FIG. 1, the applicator heads 12 are in their retracted position, the picker plungers 30 are also retracted and flush with the applicator heads 12, and the hold-down head 5 is in its retracted position. The applicator heads 12 are then moved into a generally vertical position underlying the decal hoppers 13, as shown in FIG. 2. The applicator heads are extended upwardly, as shown in FIG. 4, and picker plungers 30 are also extended, as shown in FIG. 5. Suction is created to the picker plungers 30 so that the lowermost decal 14 is grasped thereby. The picker plunger 30 and the applicator head 12 are then retracted, as shown in FIGS. 6 and 7, and the lowermost decal 14 is pulled out of the bottom opening 17 in hoppers 13 and held in the applicator head 12.

The applicator heads 12 are then swung back to their angled positions, as shown in FIG. 8, and the hold-down head 5 is lowered to hold the article 1 steady. The applicator heads 12 are then extended as shown in FIGS. 9 and 10 and the decal is applied to the sides 2 of the article. The applicator heads 12 are then withdrawn as shown in FIG. 11 and the hold-down head 5 is moved up to release the article.

The turntable 4 then moves the article to a blow-off station (FIG. 12) where jets of air from conduits 40 and 41 are applied to the sides of the decal 14 to blow off the back sheet 14a and leave the decoration 14b on the article. A suitable suction funnel 42 removes the back sheets 14a so that they do not drop on the article or mar the decoration.

The mechanism for applying a plurality of evenly spaced decals to the bottom of an article is shown in FIGS. 14 to 16 and comprises a pair of hoppers 50 adapted to hold a stack of decals therein. Each hopper comprises a plurality of L-shaped corner members 54 mounted on a plate 51 affixed to a cylinder 52 by any suitable means, such as by bolts 53. The plate 51 has an opening 55 below hopper 50 to permit decals to be pulled out therefrom. A pair of picker heads 60 having suction openings 61 in its upper surface is mounted on a slide bar 62 which is operatively connected by strap 65 to the piston rod 63 of a piston 64 movable in cylinder 52. The slide bar 62 is adapted to move the picker heads 60 under hoppers 50 and by means of the suction created through openings 61 will pull out a decal 66 from the open bottom 55 of the hoppers and hold them in place.

The picker heads 60 are then moved outwardly by slide bar 62 until they underly applicator heads 70 which are vertically movable above the article 71 which is to be decorated.

The suction in picker heads 60 is released and suction is created in applicator heads 70 so that the decal 66 is transferred from the picker heads to the applicator heads. The picker heads are then retracted and the applicator heads are lowered to apply decals to the bottom of the article 71 as shown in FIG. 16. With this arrangement, a plurality of decals may be simultaneously applied to different portions of the flat surface of an article and since the spacing between the applicator heads is fixed, the decals will be evenly spaced.

It will be seen that the present invention provides an improved mechanism for applying decals to the sides of an article and an improved mechanism for applying a plurality of decals to the bottom of an article.

As various changes may be made in the form, construction and arrangement of the parts herein without departing from the spirit and scope of the invention and without sacrificing any of the advantages herein, it is to be understood that all matter herein is to be interpreted as illustrative and not in a limiting sense.

Having thus described my invention, I claim:

1. In a machine for applying decorations to articles, means for supporting an article, a holder for a stack of thin flexible decorations offset from said supporting means, said holder having an opening in its bottom, an applicator head pivotally mounted on said machine adjacent said holder and movable from a retracted to an extended position, a picker plunger movable within said applicator head from a retracted position flush with the applicator head to an extended position, means for rotating said applicator head to a position in alignment with said holder, means for extending said applicator head to a position adjacent the opening in the bottom of said holder, means for moving said picker plunger through said bottom opening in said holder and into contact with the lowermost decoration, means in said picker plunger for grasping the decoration, means for retracting said picker plunger to remove the decoration from said holder, means for retracting said applicator head, means for rotating said applicator head to a decoration applying position adjacent said article, and means for extending said applicator head into contact with said article to apply said decoration to the article.

2. A decorating machine as claimed in claim 1, wherein said holder has an opening in its bottom and wherein said picker extends through said opening in its extended position to grasp a decoration.

3. In a mechanism for applying a decoration to an article, a holder for a stack of decorations having an opening in its bottom, article supporting means laterally spaced from said holder, an applicator head mounted for vertical movement above said article supporting means, a gripper member slidable relative to said stack of decorations from a position beneath the holder to a position beneath the applicator head, decoration gripping means on said gripper member, operating mechanism for slidably moving said gripper member, said operating mechanism including means for moving said gripper member beneath said holder, means in said gripping means for removing a decoration from the holder, said operating mechanism including means for sliding said gripper member to a position beneath said applicator head, said applicator head comprising means for transferring said decoration from said gripper member to said applicator head, and means for lowering said applicator head into contact with said article to apply said decoration to the article.

4. A mechanism as claimed in claim 3, wherein a plurality of applicator heads are provided to apply a plurality of decorations to an article and wherein a plurality of holders for decorations are provided.

References Cited in the file of this patent

UNITED STATES PATENTS

| | | |
|---|---|---|
| 1,414,856 | Bogaty et al. | May 2, 1922 |
| 2,251,884 | Hartmann | Aug. 5, 1941 |
| 2,438,514 | Miller | Mar. 30, 1948 |
| 2,520,628 | Elsner | Aug. 29, 1950 |
| 2,667,003 | Van Hofe | Jan. 26, 1954 |